United States Patent
Dong et al.

(10) Patent No.: US 11,594,922 B2
(45) Date of Patent: Feb. 28, 2023

(54) ROTOR STRUCTURE, PERMANENT MAGNET AUXILIARY SYNCHRONOUS RELUCTANCE MOTOR AND ELECTRIC VEHICLE

(71) Applicant: GREE ELECTRIC APPLIANCES, INC. OF ZHUHAI, Guangdong (CN)

(72) Inventors: Mingzhu Dong, Zhuhai (CN); Yusheng Hu, Zhuhai (CN); Tong Tong, Zhuhai (CN); Bin Chen, Zhuhai (CN); Yong Xiao, Zhuhai (CN); Suhua Lu, Zhuhai (CN)

(73) Assignee: GREE ELECTRIC APPLIANCES, INC. OF ZHUHAI, Guangdong (CN)

( * ) Notice: Subject to any disclaimer, the term of this patent is extended or adjusted under 35 U.S.C. 154(b) by 241 days.

(21) Appl. No.: 16/976,711

(22) PCT Filed: Dec. 7, 2018

(86) PCT No.: PCT/CN2018/119792
§ 371 (c)(1),
(2) Date: Aug. 28, 2020

(87) PCT Pub. No.: WO2019/174316
PCT Pub. Date: Sep. 19, 2019

(65) Prior Publication Data
US 2021/0006108 A1    Jan. 7, 2021

(30) Foreign Application Priority Data

Mar. 16, 2018 (CN) .......................... 201810219854.7

(51) Int. Cl.
*H02K 1/27* (2022.01)
*H02K 1/276* (2022.01)

(52) U.S. Cl.
CPC ......... *H02K 1/276* (2013.01); *H02K 2213/03* (2013.01)

(58) Field of Classification Search
CPC .... H02K 1/276; H02K 2213/03; H02K 29/03; H02K 21/14; H02K 1/2766; Y02T 10/64
See application file for complete search history.

(56) References Cited

U.S. PATENT DOCUMENTS

2013/0149179 A1    6/2013 Sato et al.
2017/0057373 A1*   3/2017 Hao .......................... H02K 3/28
(Continued)

FOREIGN PATENT DOCUMENTS

CN    103835945 A    6/2014
CN    203674941 U    6/2014
(Continued)

OTHER PUBLICATIONS

Extended European Search Report for European Application No. 18925076.4 dated Jul. 19, 2021 (10 pages).
(Continued)

*Primary Examiner* — Thomas Truong
(74) *Attorney, Agent, or Firm* — J. Miguel Hernandez; James R. Gourley; Carstens, Allen & Gourley, LLP

(57) ABSTRACT

The present disclosure provides a rotor structure, a permanent magnet auxiliary synchronous reluctance motor and an electric vehicle. A rotor structure includes a rotor body. The rotor body has magnetic steel slot groups. Each of the magnetic steel slot groups includes an outer layer magnetic steel slot including: a first outer layer magnetic steel slot segment, a second outer layer magnetic steel slot segment, a first bent slot, and a second bent slot. The first outer layer magnetic steel slot segment and the second outer layer magnetic steel slot segment are arranged along a radial direction of the rotor body and are opposite to each other.

(Continued)

Extended lines of a length directional geometric centerline of the first outer layer magnetic steel slot segment and a length directional geometric centerline of the second outer layer magnetic steel slot segment define a first angle.

17 Claims, 3 Drawing Sheets

(56) References Cited

U.S. PATENT DOCUMENTS

| | | | | |
|---|---|---|---|---|
| 2017/0187257 | A1* | 6/2017 | Liu | H02K 21/16 |
| 2019/0238014 | A1* | 8/2019 | Kol | H02K 1/2766 |

FOREIGN PATENT DOCUMENTS

| | | |
|---|---|---|
| CN | 205566051 U | 9/2016 |
| CN | 106151046 A | 11/2016 |
| CN | 205693464 U | 11/2016 |
| CN | 108321953 A | 7/2018 |
| CN | 108336842 A | 7/2018 |
| CN | 108336845 A | 7/2018 |
| CN | 108566005 A | 9/2018 |
| CN | 108566006 A | 9/2018 |
| CN | 108321954 A | 10/2020 |
| EP | 1582693 A1 | 10/2005 |
| EP | 3222851 A1 | 9/2017 |
| JP | H09228966 A | 9/1997 |
| JP | 2002227779 A | 8/2002 |
| WO | 2006/047519 A2 | 5/2006 |

OTHER PUBLICATIONS

International Search Report for Application No. PCT/CN2018/119792 dated Feb. 2, 2019 (3 pages).

* cited by examiner

ROTOR STRUCTURE, PERMANENT MAGNET AUXILIARY SYNCHRONOUS RELUCTANCE MOTOR AND ELECTRIC VEHICLE

CROSS-REFERENCE TO RELATED APPLICATIONS

This application claims priority benefits from China Patent Application No. 201810219854.7, filed on Mar. 16, 2018, entitled "ROTOR STRUCTURE, PERMANENT MAGNET AUXILIARY SYNCHRONOUS RELUCTANCE MOTOR AND ELECTRIC VEHICLE", the content of which is hereby incorporated by reference. This application is a 35 U.S.C. § 371 national application of international patent application PCT/CN2018/119792 filed on Dec. 7, 2018, the content of which is also hereby incorporated by reference.

TECHNICAL FIELD

The present disclosure relates to the technical field of motor device, in particular, to a rotor structure, a permanent magnet auxiliary synchronous reluctance motor, and an electric vehicle.

BACKGROUND

In related art, an anti-demagnetization ability of a rotor is improved by forming a space between two ends of a magnet accommodating slot and two ends of a permanent magnet respectively. Related art only gives a range of a pole arc between permanent magnets; that is, a spatial range of a bent slot is given. A flux barrier is also provided at an end of the permanent magnet in related art, and angles of the flux barrier, the permanent magnet, and between the permanent magnets in the V-shape are specified. However, the flux barrier is closer to a centerline of a pole relative to an extended line of the permanent magnet, which is not conducive to increase flux linkages in the permanent magnets. Secondly, the angle between the two permanent magnets in the V-shape is from 130° to 160° in related art. When a number of poles is less than 6, the angle can be well achieved. However, when the number of poles is relatively large, such as 12, the angle occupied by each pole is only 30°, and keeping that large angle of the two permanent magnets in the V-shape will only greatly decrease the sizes of the permanent magnets, which affects output of the motor.

Related art also provides an anti-demagnetization design for the reluctance rotor using U-shaped or V-shaped permanent magnets. The main technical point is that the flux barrier at an end of the permanent magnet of the rotor is chamfered. The permanent magnet is chamfered as well. A preferred chamfering angle range is given. However, in the given range of the length ratio of two sides of the chamfer and the given range of the chamfering angle, a situation may exist that the distal end of the permanent magnet may be cut into a bevel when the permanent magnet is very thin and the chamfering angle is large. The anti-demagnetization ability of the permanent magnet has a great relation with a thickness of the permanent magnet. When the permanent magnet is cut into this shape, the thickness decrease in the magnetization direction may cause serious demagnetization.

The permanent magnets of some rotors are composed of multiple pieces. Under an effect of a demagnetization magnetic field, the demagnetization rates for some pieces are large, such as more than 20%, and the demagnetization rates for other pieces are small, such as less than 3%. Generally, the overall anti-demagnetization ability of the permanent magnet is decided by the single piece that has the weakest demagnetization ability. Therefore, the motor in related art has problems such as an unpractical structure and a poor anti-demagnetization ability.

SUMMARY

A main object of the present disclosure is to provide a rotor structure, a permanent magnet auxiliary synchronous reluctance motor, and an electric vehicle to solve the problem of the poor anti-demagnetization ability of the motor in related art.

In order to achieve the object, according to one aspect of the present disclosure, a rotor structure is provided, including: a rotor body, the rotor body being provided with permanent magnet slot groups, the permanent magnet slot groups each including an outer layer permanent magnet slot, and the outer layer permanent magnet slot including: a first outer layer permanent magnet slot segment; a second outer layer permanent magnet slot segment, the first outer layer permanent magnet slot segment and the second outer layer permanent magnet slot segment being arranged along a radial direction of the rotor body and being opposite to each other, extended lines of a length directional geometric centerline of the first outer layer permanent magnet slot segment and a length directional geometric centerline of the second outer layer permanent magnet slot segment defining a first angle; a first bent slot, the first bent slot being communicated with the first outer layer permanent magnet slot segment; a second bent slot, the second bent slot being communicated with the second outer layer permanent magnet slot segment, and extended lines of a length directional geometric centerline of the first bent slot and a length directional geometric centerline of the second bent slot defining a second angle, wherein the second angle is greater than the first angle.

Further, a first end of the first outer layer permanent magnet slot segment is arranged extending toward a rotating shaft hole of the rotor body; a second end of the first outer layer permanent magnet slot segment is arranged extending toward an outer edge of the rotor body; a first end of the second outer layer permanent magnet slot segment is arranged extending toward the rotating shaft hole; and a second end of the second outer layer permanent magnet slot segment is arranged toward the outer edge of the rotor body.

Further, the first bent slot and the second bent slot are respectively located on two sides of a direct-axis of the rotor body; a first end of the first bent slot is communicated with the second end of the first outer layer permanent magnet slot segment; a second end of the first bent slot extends toward the outer edge of the rotor body and is arranged gradually away from the direct-axis; a first end of the second bent slot is communicated with the second end of the second outer layer permanent magnet slot segment; and a second end of the second bent slot extends toward the outer edge of the rotor body and is arranged gradually away from the direct-axis.

Further, a width of the second end of the first bent slot is smaller than a width of the first end of the first bent slot, and/or a width of the second end of the second bent slot is less than a width of the first end of the second bent slot.

Further, the first end of the second outer layer permanent magnet slot segment is arranged opposite to the first end of the first outer layer permanent magnet slot segment to form a V-shaped structure, or, the first end of the second outer layer permanent magnet slot segment is communicated with the first end of the first outer layer permanent magnet slot segment to form a U-shaped structure.

Further, the permanent magnet slot groups each further includes an inner layer permanent magnet slot; the outer layer permanent magnet slot is arranged adjacent to the inner layer permanent magnet slot; a magnetic conducting path is formed between the outer layer permanent magnet slot and the inner layer permanent magnet slot; the inner layer permanent magnet slot includes a first inner layer permanent magnet slot segment, a second inner layer permanent magnet slot segment, and a third inner layer permanent magnet slot segment arranged sequentially; the first inner layer permanent magnet slot segment, the second inner layer permanent magnet slot segment, and the third inner layer permanent magnet slot segment are communicated sequentially to form a U-shaped structure with an opening toward the outer edge of the rotor body, or, the first inner layer permanent magnet slot segment, the second inner layer permanent magnet slot segment, and the third inner layer permanent magnet slot segment are sequentially arranged at intervals; and a flux barrier is formed between two adjacent ones of the first inner layer permanent magnet slot segment, the second inner layer permanent magnet slot segment and the third inner layer permanent magnet slot segment.

Further, the inner layer permanent magnet slot includes a third bent slot, a first end of the third bent slot is communicated with an end, adjacent to the outer edge of the rotor body, of the first inner layer permanent magnet slot segment, and a second end of the third bent slot extends toward the outer edge of the rotor body and is gradually away from the direct-axis of the rotor body; the inner layer permanent magnet slot includes a fourth bent slot, a first end of the fourth bent slot is communicated with an end, adjacent to the outer edge of the rotor body, of the third inner layer permanent magnet slot segment, and a second end of the fourth bent slot extends toward the outer edge of the rotor body and is gradually away from the direct-axis.

Further, $0.3 \times Wm1 < Lt1/k1 < 0.7 \times Wm1$, wherein $Wm1$ is a width of the first outer layer permanent magnet slot segment or the second outer layer permanent magnet slot segment; $Lt1$ is a length of a flux barrier formed between a slot wall of the first bent slot or the second bent slot and the outer edge of the rotor body; and $k1$ is a first per unit value.

Further, $0.1 \times Wm2 < Lt2/k2 < 0.35 \times Wm2$, wherein $Wm2$ is a width of the first inner layer permanent magnet slot segment or the third inner layer permanent magnet slot segment; $Lt2$ is a length of a flux barrier formed between a slot wall of the third bent slot or the fourth bent slot and the outer edge of the rotor body; and $k2$ is the second per unit value.

Further, $0.6 < Lt1/(Lt1/k1+Lt2/k2) < 0.9$.

Further, $Wm1/Wm2 = a \times (Lt1/k1/Lt2/k2) + b \times (L1/L2)$, wherein $a$ is a weight of a ratio of lengths of the flux barriers on the rotor structure; $b$ is a weight of a ratio of average widths of the bent slots on the rotor structure; $L1$ is an average width of the first bent slot and/or the second bent slot; $L2$ is an average width of the third bent slot and/or the fourth bent slot.

Further, $a \in [1,2]$, and/or, $b=1$.

Further, the rotor structure further includes an outer layer permanent magnet and an inner layer permanent magnet. The outer layer permanent magnet is disposed in the outer layer permanent magnet slot, and the inner layer permanent magnet is disposed in the inner layer permanent magnet slot.

Further, $\min(J1, J2) > Ns \times A \times Wt/4P$, wherein $J1$ is a minimum distance between a distal end of the outer layer permanent magnet and the outer edge of the rotor body; $J2$ is a minimum distance between a distal end of the inner layer permanent magnet and the outer edge of the rotor body; $Ns$ is a number of a stator teeth; $A$ is an angle of a pole arc, the angle being defined between lines connecting ends of side walls of the third bent slot and the fourth bent slot and a hole center of the rotating shaft hole of the rotor body, the side walls being at sides adjacent to the direct-axis; $Wt$ is a width of each of the stator teeth; and $P$ is a number of poles of the rotor structure.

Further, the permanent magnet slot groups each further includes a third layer permanent magnet slot; the third layer permanent magnet slot is adjacent to the inner layer permanent magnet slot; a magnetic conducting path is formed between the third layer permanent magnet slot and the inner layer permanent magnet slot; and the third layer permanent magnet slot is U-shaped or arc-shaped.

Further, the permanent magnets are made of ferrite or bonded neodymium iron boron.

Further, when $Wt1 < Wt2$, $k1=1$, $k2=\max(Wt1, Wt2)/\min(Wt1, Wt2)$, or, when $Wt1 > Wt2$, $k2=1$, $k1=\max(Wt1, Wt2)/\min(Wt1, Wt2)$, wherein $Wt1$ is a width of the flux barrier formed between the slot wall of the first bent slot or the second bent slot and the outer edge of the rotor body; and $Wt2$ is a width of the flux barrier formed between the slot wall of the third bent slot or the fourth bent slot and the outer edge of the rotor body.

According to another aspect of the present disclosure, a permanent magnet auxiliary synchronous reluctance motor is provided, including a rotor structure, and the rotor structure is the above rotor structure.

According to another aspect of the present disclosure, an electric vehicle is provided, including a rotor structure, and the rotor structure is the above rotor structure.

In the technical solution of the present disclosure, the second angle formed by the extended lines of the length directional geometric centerline of the first bent slot and the length directional geometric centerline of the second bent slot is arranged to be greater than the first angle formed by the extended lines of the length directional geometric centerline of the first outer layer permanent magnet slot segment and the length directional geometric centerline of the second outer layer permanent magnet slot segment. In this arrangement, while ensuring that an inductance of the d-axis is basically unchanged, the demagnetization magnetic field is guided to be "food discharged" across the bent slots at the q-axis, reducing effect of the demagnetization magnetic field on an original magnetic field of the permanent magnet, and effectively improving the overall anti-demagnetization ability of a motor having such rotor structure.

BRIEF DESCRIPTION OF THE DRAWINGS

The accompanying drawings, which form a part of the present disclosure, are used to provide a further understanding of the present disclosure. The schematic embodiments of the present disclosure and the descriptions thereof are used to explain the present disclosure, and do not constitute an improper limitation on the present disclosure. In the drawings.

DETAILED DESCRIPTION OF THE EMBODIMENTS

Figure 1:
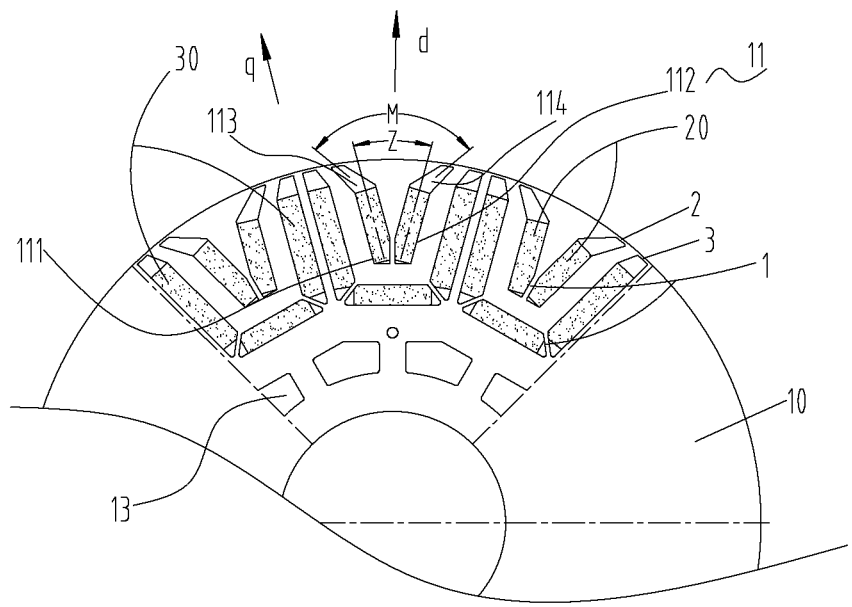
FIG. 1 shows a schematic structural view of a first embodiment of a rotor structure according to the present disclosure.

It should be noted that the embodiments in the present disclosure and the features in the embodiments can be combined with each other under the premise of no conflict. The present disclosure will be described in details below with reference to the drawings and in combinations with the embodiments.

It should be noted that the terminologies used herein are only intended to describe specific embodiments and not intended to limit according to the exemplary embodiments of the present disclosure. As used herein, the singular forms are intended to include the plural forms as well, unless the context clearly indicates otherwise; and it should also be understood that when the terms of "include" and/or "comprise" are used in the present specification, they indicate that there are features, steps, operations, devices, assemblies, and/or combinations thereof.

It should be noted that the terms "first" and "second" in the specification, claims and drawings of the present disclosure are used to distinguish similar objects, and are not necessarily used to describe a specific order or sequence. It should be understood that the terms so used are interchangeable under appropriate circumstances so that, for example, the embodiments of the present disclosure described herein can be implemented in an order other than those illustrated or described herein. In addition, the terms "include" and "have" and any variations thereof are intended to cover non-exclusive inclusions; for example, processes, methods, systems, products or equipment that contain a series of steps or units need not be limited to those clearly listed steps or units, but may include other steps or units not explicitly listed or inherent to these processes, methods, products, or equipment.

For facilitating the description, terms that express relative spatial concepts, such as "on", "over", "on the upper surface of", "above", and etc., can be used here to describe the spatial location relationship between one device or feature and other devices or features shown in the drawings. It should be understood that the terms that express relative spatial concepts are intended to include the different orientations in use or operation in addition to the orientation of the device as described in the drawings. For example, if a device in the drawings is turned over, the devices described as "over" or "above" other devices or constructions will be positioned "beneath" or "below" other devices or constructions. Thus, the exemplary term of "above" may include both directions of "above" and "below". The device can also be positioned in other different ways (to be rotated 90 degrees or on other orientations), and the relative description of space used herein is explained accordingly.

Now, exemplary embodiments according to the present disclosure will be described in more details with reference to the accompanying drawings. However, these exemplary embodiments can be implemented in many different forms, and should not be construed as being limited to the embodiments set forth herein. It should be understood that these embodiments are provided to make the disclosure of this disclosure thorough and complete, and to fully convey the ideas of these exemplary embodiments to those of ordinary skill in the art. In the drawings, for the sake of clarity, it is possible to enlarge thicknesses of layers and regions, and the same reference numerals are used to denote the same devices, thus their description will be omitted.

As shown in combination of FIGS. 1 to 6, according to embodiments of the present disclosure, a rotor structure is provided.

Specifically, as shown in FIG. 1, the rotor structure includes a rotor body 10. The rotor body 10 is provided with permanent magnet slot groups. The permanent magnet slot groups each includes an outer layer permanent magnet slot 11. The outer layer permanent magnet slot 11 includes a first outer layer permanent magnet slot segment 111, a second outer layer permanent magnet slot segment 112, a first bent slot 113, and a second bent slot 114. The first outer layer permanent magnet slot segment 111 and the second outer layer permanent magnet slot segment 112 are arranged along a radial direction of the rotor body 10 and are opposite to each other. Extended lines of a length directional geometric centerline of the first outer layer permanent magnet slot segment 111 and a length directional geometric centerline of the second outer layer permanent magnet slot segment 112 define a first angle Z. The first bent slot 113 is communicated with the first outer layer permanent magnet slot segment 111. The second bent slot 114 is communicated with the second outer layer permanent magnet slot segment 112. Extended lines of a length directional geometric centerline of the first bent slot 113 and a length directional geometric centerline of the second bent slot 114 define a second angle M. The second angle is greater than the first angle Z.

In the present embodiment, the second angle defined by the extended lines of the length directional geometric centerline of the first bent slot 113 and the length directional geometric centerline of the second bent slot 114 is arranged to be greater than the first angle defined by the extended lines of the length directional geometric centerline of the first outer layer permanent magnet slot segment 111 and the length directional geometric centerline of the second outer layer permanent magnet slot segment 112. In this arrangement, while ensuring that an inductance in the d-axis is basically unchanged, the demagnetization magnetic field is guided to be "flood discharged" across the bent slots at the q-axis, reducing effect of the demagnetization magnetic field on an original magnetic field of the permanent magnets, and effectively improving the overall anti-demagnetization ability of a motor having such rotor structure. The "flood discharge" refers to comparing a demagnetization magnetic field to flood water with a certain potential energy, and comparing an inherent magnetic field of the permanent magnet to a dam; and when the potential energy of the flood water accumulates to a certain extent, inherent magnetism of the original permanent magnet will be destroyed. Through a certain rotor design, the potential energy of the flood water can be discharged through paths other than the permanent magnets to avoid the demagnetization potential energy being concentrated on the permanent magnets, which can effectively improve the anti-demagnetization ability.

Wherein, a first end of the first outer layer permanent magnet slot segment 111 is arranged extending toward a rotating shaft hole 14. A second end of the first outer layer permanent magnet slot segment 111 is arranged extending toward an outer edge of the rotor body 10. A first end of the second outer layer permanent magnet slot segment 112 is arranged extending toward the rotating shaft hole 14. A second end of the second outer layer permanent magnet slot segment 112 is arranged toward the outer edge of the rotor body 10. The first bent slot 113 and the second bent slot 114 are located on two sides of the direct-axis d of the rotor body 10, respectively. A first end of the first bent slot 113 is communicated with the second end of the first outer layer permanent magnet slot segment 111. A second end of the first bent slot 113 is arranged extending toward the outer edge of the rotor body 10 and gradually away from the direct-axis. A first end of the second bent slot 114 is communicated with the second end of the second outer layer permanent magnet slot segment 112, and a second end of the second bent slot 114 is arranged extending toward the outer edge of the rotor body 10 and gradually away from the direct-axis. This arrangement can effectively improve the anti-demagnetization ability of the rotor structure.

In the present embodiment, a width of the second end of the first bent slot 113 is smaller than a width of the first end of the first bent slot 113, or a width of the second end of the second bent slot 114 is smaller than a width of the first end of the second bent slot 114. Certainly, these two situations can also exist at the same time. This arrangement can effectively improve the anti-demagnetization ability of the rotor structure.

Figure 2:
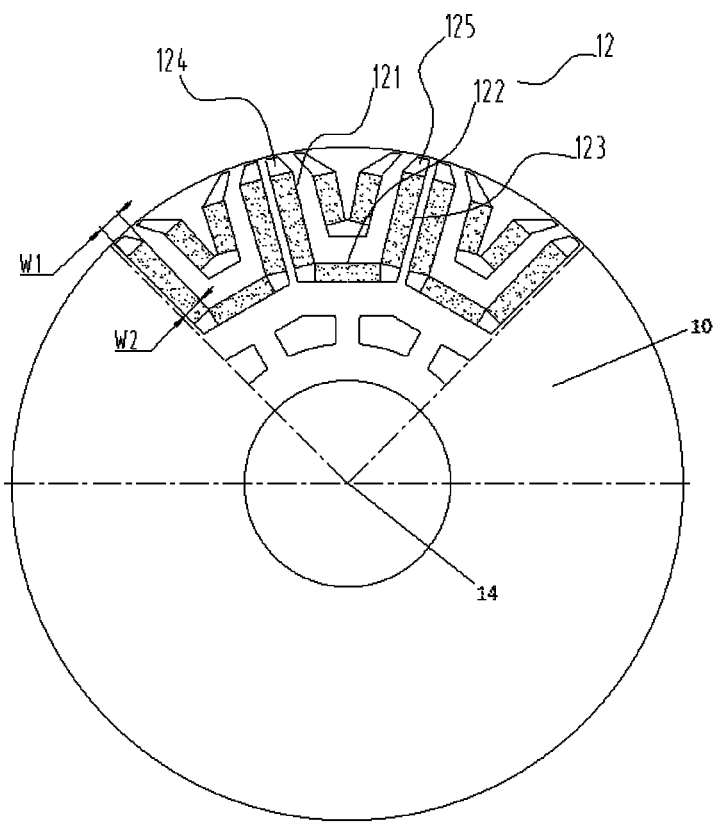
FIG. 2 shows a schematic structural view of a second embodiment of the rotor structure according to the present disclosure.
Figure 3:
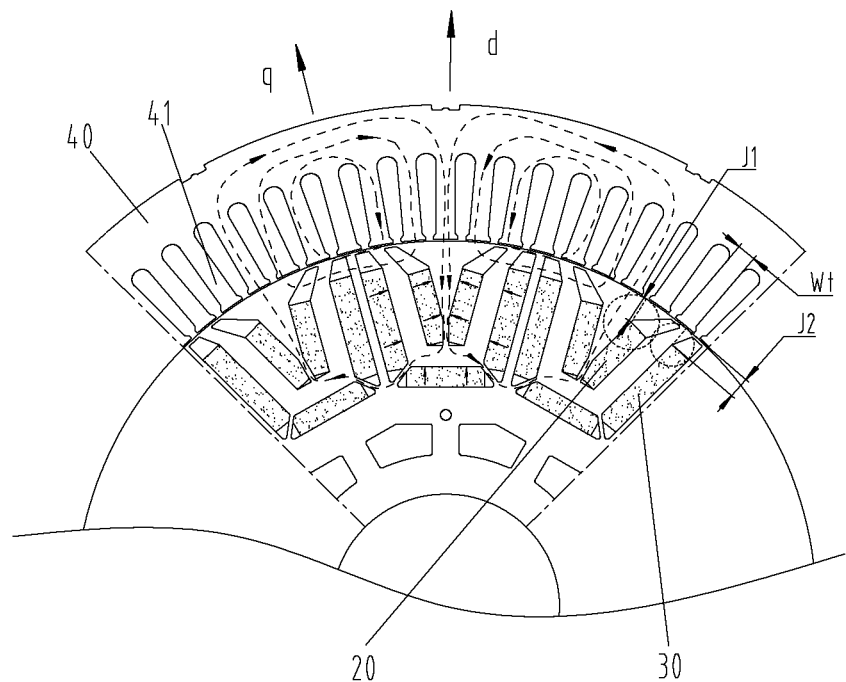
FIG. 3 shows a schematic structural view of a third embodiment of the rotor structure according to the present disclosure.
Figure 4:
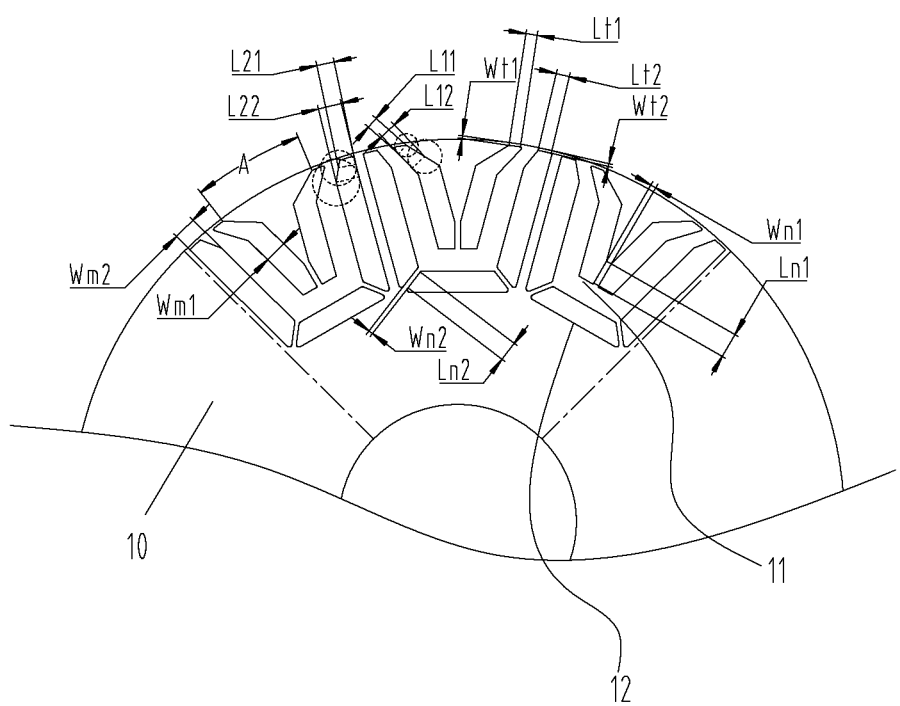
FIG. 4 shows a schematic structural view of a fourth embodiment of the rotor structure according to the present disclosure.
Figure 5:
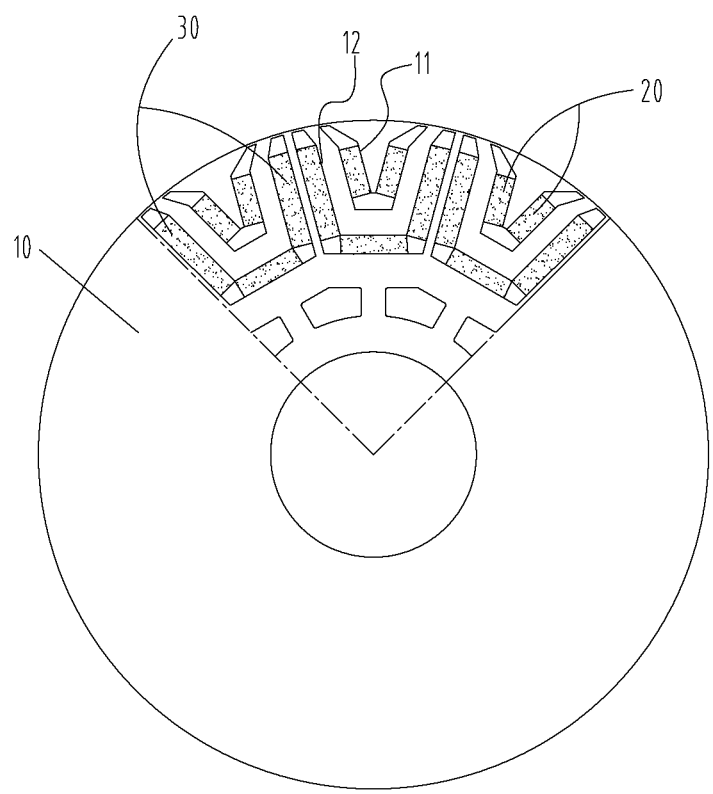
FIG. 5 shows a schematic structural view of a fifth embodiment of the rotor structure according to the present disclosure.
Figure 6:
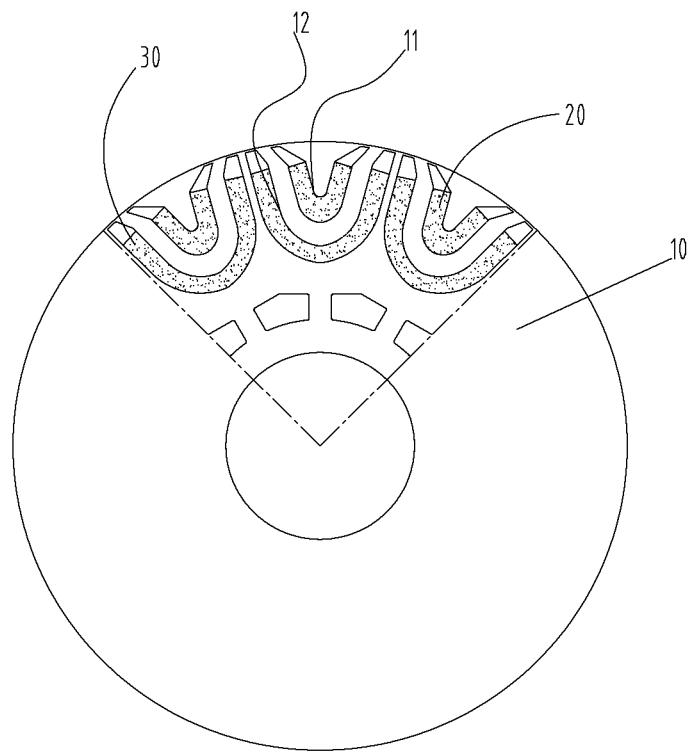
FIG. 6 shows a schematic structural view of a sixth embodiment of the rotor structure according to the present disclosure.

As shown in FIGS. 1, 3 and 4, the first end of the second outer layer permanent magnet slot segment 112 is opposite to the first end of the first outer layer permanent magnet slot segment 111 to form a V-shaped structure. As shown in FIGS. 2, 5 and 6, the first end of the second outer layer permanent magnet slot segment 112 is communicated with the first end of the first outer layer permanent magnet slot segment 111 to form a U-shaped structure. These arrangements can effectively optimize a magnetic circuit of the rotor structure and achieve an effect of increasing the rotor torque.

Further, the permanent magnet slot groups each further includes an inner layer permanent magnet slot 12. The outer layer permanent magnet slot 11 is arranged adjacent to the inner layer permanent magnet slot 12, and a magnetic conducting path is formed between the outer layer permanent magnet slot 11 and the inner layer permanent magnet slot 12. The inner layer permanent magnet slot 12 includes a first inner layer permanent magnet slot segment 121, a second inner layer permanent magnet slot segment 122, and a third inner layer permanent magnet slot segment 123 arranged sequentially. The first inner layer permanent magnet slot segment 121, the second inner layer permanent magnet slot segment 122, and the third inner layer permanent magnet slot segment 123 are communicated sequentially to form a U-shaped structure with an opening toward the outer edge of the rotor body 10; or the first inner layer permanent magnet slot segment 121, the second inner layer permanent magnet slot segment 122, and the third inner layer permanent magnet slot segment 123 are sequentially arranged at intervals; and a flux barrier is formed between two adjacent ones of the first inner layer permanent magnet slot segment 121, the second inner layer permanent magnet slot segment 122, and the third inner layer permanent magnet slot segment 123.

In order to further improve the anti-demagnetization ability of the rotor structure, the inner layer permanent magnet slot 12 further includes a third bent slot 124. A first end of the third bent slot 124 is communicated with an end, adjacent to the outer edge of the rotor body 10, of the first inner layer permanent magnet slot segment 121. A second end of the third bent slot 124 extends toward the outer edge of the rotor body 10 and is gradually away from the direct-axis of the rotor body 10. The inner layer permanent magnet slot 12 further includes a fourth bent slot 125. A first end of the fourth bent slot 125 is communicated with an end, adjacent to the outer edge of the rotor body 10, of the third inner layer permanent magnet slot segment 123. A second end of the fourth bent slot 125 extends toward the outer edge of the rotor body 10 and is gradually away from the direct-axis.

Specifically, in order to ensure the balance between the performance and the anti-demagnetization ability, the rotor structure satisfies: $0.3 \times Wm1 < Lt1/k1 < 0.7 \times Wm1$, wherein $Wm1$ is a width of the first outer layer permanent magnet slot segment 111 or the second outer layer permanent magnet slot segment 112, and $Lt1$ is a length of a flux barrier formed between a slot wall of the first bent slot 113 or the second bent slot 114 and the outer edge of the rotor body 10. $k1$ is a first per unit value. $0.1 \times Wm2 < Lt2/k2 < 0.35 \times Wm2$, wherein $Wm2$ is a width of the first inner layer permanent magnet slot segment 121 or the third inner layer permanent magnet slot segment 123; $Lt2$ is a length of a flux barrier formed between a slot wall of the third bent slot 124 or the fourth bent slot 125 and the outer edge of the rotor body 10; $k2$ is a second per unit value; and $0.6 < Lt1/(Lt1/k1+Lt2/k2) < 0.9$. $Wm1/Wm2 = a \times (Lt1/k1/Lt2/k2) + b \times (L1/L2)$, wherein a is a weight of a ratio of lengths of the flux barriers on the rotor structure, and b is a weight of a ratio of average widths of the bent slots on the rotor structure. Wherein, the average width of the first bent slot 113 can be obtained by: taking n pairs of points respectively at two ends of the bent slot, the two ends are in the width direction of the first bent slot 113; finding a length of a line connecting between the two points of each pair (certainly, the length of the line connecting between the two points of each pair can be the shortest distance between the two opposite side walls); and then figuring out a ratio of a total of the lengths of the connecting lines to n. $L1$ is an average width of the first bent slot 113 or the second bent slot 114, and $L2$ is an average width of the third bent slot 124 or the fourth bent slot 125, wherein $L1=(L11+L12+L1n)/n$, $L2=(L21+L22+L2n)/n$, n is the number of the points taken on a contour line of the bent slot, the contour line is at the side adjacent to the d-axis. Accuracy can be satisfied when n is greater than four. In some embodiments, $a \in [1,2]$, $b=1$.

Further, the rotor structure further includes an outer layer permanent magnet 20 and an inner layer permanent magnet 30. The outer layer permanent magnet 20 is disposed in the outer layer permanent magnet slot 11, and the inner layer permanent magnet 30 is disposed in the inner layer permanent magnet slot 12. To further avoid local demagnetization, local demagnetization can be avoided when having the following relationship, $\min(J1, J2) > Ns \times A \times Wt/4P$, wherein $J1$ is a minimum distance between the distal end of the outer layer permanent magnet 20 and the outer edge of the rotor body 10; $J2$ is a minimum distance between the distal end of the inner layer permanent magnet 30 and the outer edge of the rotor body 10; $Ns$ is a number of stator teeth 41; $A$ is an angle of a pole arc, the angle is defined between lines connecting ends of side walls of the third bent slot 124 and the fourth bent slot 125 and a hole center of the rotating shaft hole 14, the side walls are at the sides adjacent to the direct-axis; $Wt$ is a width of each stator tooth; and $P$ is the number of poles of the rotor structure.

In the present embodiment, the permanent magnet slot group further includes a third layer permanent magnet slot;

the third layer permanent magnet slot is adjacent to the inner layer permanent magnet slot 12; a magnetic conducting path is formed between the third layer permanent magnet slot and the inner layer permanent magnet slot 12; and the third layer permanent magnet slot is U-shaped or arc-shaped. The permanent magnet is made of a ferrite or a bonded neodymium iron boron. This arrangement is beneficial to enhance the anti-demagnetization ability of the rotor structure.

When Wt1<Wt2, k1=1, k2=max(Wt1, Wt2)/min(Wt1, Wt2); or, when Wt1>Wt2, k2=1, k1=max(Wt1, Wt2)/min (Wt1, Wt2), wherein Wt1 is a width of the flux barrier formed between the slot wall of the first bent slot 113 or the second bent slot 114 and the outer edge of the rotor body 10; and Wt2 is a width of the flux barrier formed between the slot wall of the third bent slot 124 or the fourth bent slot 125 and the outer edge of the rotor body 10.

The rotor structure in the above embodiment can also be used in the technical field of motor equipment; that is, according to another aspect of the present disclosure, a motor is provided, including a rotor structure; and the rotor structure is the rotor structure in the above embodiment.

The rotor structure in the above embodiment can also be used in the field of automobiles; that is, according to another aspect of the present disclosure, an electric vehicle is provided, including a rotor structure; and the rotor structure is the rotor structure in the above embodiment.

In the present embodiment, the rotor structure is provided with permanent magnet slots, and an end of the permanent magnet slot adjacent to the outer circle of the rotor has a bent structure different in shape from a major part of the permanent magnet slot. Therefore, at this bent place, the permanent magnet slot is divided into the major part of the permanent magnet slot and the distal bent slot of permanent magnet slot. Under each pole, the angle between the distal ends of the permanent magnet slots is greater than the angle between the major parts of the permanent magnet slots (M>Z). The closer the widths to the outer circle of the rotor, the smaller the widths (L12, L11; L22, L21) of the distal ends of the permanent magnet slots. A plurality of pieces of permanent magnet plates are usually disposed in the inner layer permanent magnet slot, and the pieces of permanent magnet plates are spliced into a U shape. The permanent magnet plates in the outer layer are spliced into a V-shape or a U-shape. In order to ensure that the area of the permanent magnet adjacent to the distal bent slot of the permanent magnet slot does not have a local demagnetization, a thickness W1 of this area is greater than a thickness W2 of another end of the permanent magnet. When the permanent magnet slot is of V-shaped structure, a radial-oriented flux barrier is formed between the permanent magnet slot segments. A tangential-oriented flux barrier is formed between the distal end of the bent slot and the outer edge of the rotor.

The tangential-oriented flux barrier: a tangential-oriented thin wall located at the end of the bent slot and between the bent slot and an air gap, and an extending direction of the thin wall is a circumferential tangential direction. The radial-oriented flux barrier: a thin wall located at the folding groove adjacent to the center of circle, an extending direction of the thin wall is the radial direction. Demagnetization fluctuation rate: when a certain demagnetization magnetic field is applied, and when each piece of permanent magnet is demagnetized to more than 5%, a demagnetization rate of every piece of permanent magnet is counted, and the demagnetization fluctuation rate=average demagnetization rate/ (maximum demagnetization rate−minimum demagnetization rate).

As shown in FIG. 4, Wn1: a width of the radial-oriented flux barrier of the outer layer permanent magnet slot, Wn2: a width of the radial-oriented flux barrier of the inner layer permanent magnet slot, Ln1: a length of the radial flux barrier of the outer layer permanent magnet slot, Ln2: a length of the radial flux barrier of the inner layer permanent magnet slot.

This disclosure is directed to the permanent magnet reluctance motor whose permanent magnets are made of ferrite or bonded neodymium iron boron. Compared with rare earth motors, the ferrite has the disadvantage of low intrinsic coercive force, so a design focusing on anti-demagnetization is needed. Specifically, a rotor lamination is provided with the permanent magnet slots, hollow holes 13 to reduce weight, and a rotating shaft hole for fixing the rotor. There are at least two layers of permanent magnet slots, one is the inner layer permanent magnet slot adjacent to the shaft hole, and the other is the outer layer permanent magnet slot adjacent to the outer circle of the rotor. The hollowed rotor lamination is a unibody through the connections of the tangential-oriented flux barriers at the outer circle and the radial-oriented flux barriers across the permanent magnet slot. The tangential-oriented flux barriers are essential, and the radial-oriented flux barriers are optional according to the strength of the rotor.

The U-shaped structure has difficulty in forming and processing as it is deeply recessed to the center. The multipiece splicing type structure is not only simple, but also provides spaces for arranging the radial-oriented flux barriers, which also act as reinforcing ribs. With this type of structure having the reinforcing ribs, an effect of relieving the demagnetization at the bottom of the U-shaped structure can be achieved.

The outer layer adopts the V-shaped structure, which is suitable for the structure with a large number of poles, such as 8 poles, 12 poles, or more, and is simplified from the U-shaped structure. In addition, due to the narrowed angle, and the changing of the radial-oriented flux barrier number from two in the U-shaped structure to one, the magnetic concentration effect is more obvious, and it is beneficial to increase the permanent magnet flux linkage.

As can be seen from FIG. 3, a main path of the demagnetization magnetic field is as follows: 1. passing through the radial-oriented flux barrier in the d-axis, and closed in the d-axis; 2. passing through the tangential-oriented flux barrier, and closed around the q-axis; 3. passing across the distal bent slots of the permanent magnet slots. The study found that in the actual demagnetization situation, the radial-oriented flux barrier and the tangential-oriented flux barrier are easy to be saturated, and many demagnetization magnetic field lines will pass across the distal bent slots of the permanent magnet slots. The thickness of the permanent magnet depends mainly on magnetic resistances of these three main paths.

Through bending and outward expanding of the distal bent slots of the permanent magnet slots and having the flux barrier adjacent to the q-axis, the length of the tangential-oriented flux barrier can be reduced, and the average width of the distal bent slot of the permanent magnet slot can be reduced, thereby reducing the magnetic resistance on the q-axis, and improving the demagnetization magnetic potential on the permanent magnet.

The width of the distal bent slot of the permanent magnet slot has the smallest value at the outer circle of the rotor, and the width is continuously increasing along the direction toward the center of circle of the rotor, which is beneficial to share a portion of demagnetization magnetic field lines to pass across the distal bent slots when the tangential-oriented flux barrier is excessively saturated. An angle between the two contour edges of the distal bent slot is usually from 15° to 45° (mechanical angle) to ensure that the scale of the continuous increasing is not too large or too small.

The width of the distal end of the permanent magnet slot can be understood as an average value of the shortest distances from one contour edge, adjacent to the d-axis, of the bent slot to the other contour edge, which can be further defined as follows: any point on the edge is taken, a circle is made by taking this point as the center, the radius of the circle tangent to the opposite edge is the shortest distance, and multiple points are taken like this. The distances at the inner layer permanent magnet slots are: L21, L22 . . . , and the distances at the outer layer permanent magnet slots are: L11, L12 . . . , respectively. Average values of the two groups are calculated to obtain the average distances of the distal bent slots of the permanent magnet slots, which are L2 and L1 respectively.

However, due to the bent, reduction in magnetic resistance in this path will cause an excessive increase in inductance in the d-axis of the rotor, so the performance would be poor. In order to ensure the anti-demagnetization ability of the permanent magnet and avoid a decline of a salient pole ratio caused by the excessive increase of the inductance in the d-axis, the lengths of the flux barriers and the thicknesses of the permanent magnet satisfy the following relationships, so that the anti-demagnetization ability of the permanent magnet can be guaranteed:

$$0.1 \times Wm2 < Lt2 < 0.35 \times Wm2;$$

$$0.3 \times Wm1 < Lt1 < 0.7 \times Wm1.$$

Further, due to the existence of the path 1 of the demagnetization magnetic field, the magnetic potential borne by the outer layer permanent magnet is often too small, and the length Lt1 of the tangential-oriented flux barrier of the outer layer permanent magnet slot needs to be greater than the length Lt2 of the tangential-oriented flux barrier of the inner layer permanent magnet slot to achieve a uniform distribution of the magnetic potential, that is: $0.6 < Lt1/(Lt1+Lt2) < 0.9$. Since the demagnetization magnetic field is basically distributed on the outer circle of the rotor, the magnet steel does not have a chamfer in order to ensure that the distal end of the magnet steel adjacent to the outer circle of the rotor has a high anti-demagnetization ability. The magnet steel at this end has a rectangle shape with equal thickness, or has a slightly increased thickness, usually the increase in thickness will not exceed 10%, as shown by W1 and W2 in FIG. 2.

Further, the overall improvement of the anti-demagnetization ability does not mean that the demagnetization has reached the optimal value. The demagnetization rate of each piece of permanent magnet should be as balanced as possible. Therefore, the magnetic resistance of the distal bent slot of the permanent magnet slot is necessary to be further considered. By introducing parameters of the average distances L1, L2 of the distal bent slots of the permanent magnet slots, the demagnetization rates of the permanent magnets at the inner layer and outer layer can be more uniform when the following relationship is satisfied. Even when the flux barrier is extremely saturated, a magnetic permeability thereof is still greater than that of air. When a weight is 1.3 to 2, the flux barrier can be equivalent to air after an amortized computation. According to this calculation method, the magnetic potential can be evenly distributed:

$$Wm1/Wm2 = a \times (Lt1/Lt2) + b \times (L1/L2);$$

where $a \in [1.3, 2]$, $b=1$;

a is the weight of the ratio of the lengths of the flux barriers on the rotor structure, and b is the weight of the ratio of the average widths of the bent slots on the rotor structure.

Further, in view of the paths of the demagnetization magnetic field, when a bent point of the permanent magnet slot is too close to the outer circle, the magnetic conducting area of the distal bent slot of the permanent magnet slot is reduced, and the magnetic resistance is increased, which would force the magnetic field lines to pass through the permanent magnet, and would cause the demagnetization. Therefore, a space between the permanent magnet and the outer circle of the rotor must be ensured: $\min(J1, J2) > Ns \times A \times Wt/4P$.

That is, the magnitude of A determines main magnitude of the demagnetization magnetic field received from the stator 40 that all the permanent magnets in the rotor need to overcome. Therefore, the minimum value in the closest distances from the benting points of the layers of the permanent magnet slots to the outer circle of the rotor is greater than the sum of the widths of half of the number of teeth at each pole multiplied by the angle of the pole arc, the angle is defined between lines connecting the points, adjacent to the d-axis, of the distal ends of the bent slots and the center of circles. This can ensure that the magnetic field lines are not too saturated at the outer periphery of the rotor, causing local demagnetization of the distal part of the permanent magnets.

Further consider that when the widths of the flux barriers are different, the formulas of the Lt1 and Lt2 need to be expressed in per-unit system. For example, after the width Lt2 is increased by k times, corresponding Lt2 value in the formula should be divided by k, so as to ensure the accuracy of the design.

In the embodiment without the radial-oriented flux barrier, although the inductance in the d-axis will change to some extent, the protection scope required above is still valid. In the embodiment without the radial-oriented flux barrier, the permanent magnet is integrated, as shown in FIG. 6, which is also applicable to the universality of the distal bent slot of the permanent magnet slot and the radial-oriented flux barrier.

In addition to the above, what needs to be explained is that in this specification, "an embodiment", "another embodiment", "embodiments", etc. refer to that specific features, structures or characteristics described in combination with this embodiment are in at least one embodiment described broadly in this disclosure. Same expression appeared in multiple places in the specification does not necessarily refer to the same embodiment. Further, when specific features, structures, or characteristics are described in combination with any of the embodiments, it is claimed that implementing such features, structures, or characteristics in combination with other embodiments also falls within the scope of the present disclosure.

In the above embodiments, description of each embodiment has its own emphasis. For the part that is not described in detail in an embodiment, related descriptions in other embodiments can be referred.

The above-mentioned are only embodiments of the present disclosure and are not intended to limit the present disclosure. For those skilled in the art, the present disclosure may have various modifications and changes. Any modification, equivalent replacement, improvement, etc. made within the spirit and principle of the present disclosure shall be included in the protection scope of the present disclosure.

What is claimed is:

1. A rotor structure comprising:
   a rotor body, the rotor body being provided with permanent magnet slot groups, the permanent magnet slot groups each comprising an outer layer permanent magnet slot, and the outer layer permanent magnet slot comprising:
   a first outer layer permanent magnet slot segment;
   a second outer layer permanent magnet slot segment, the first outer layer permanent magnet slot segment and the second outer layer permanent magnet slot segment are arranged along a radial direction of the rotor body and are opposite to each other, and extended lines of a length directional geometric centerline of the first outer layer permanent magnet slot segment and a length directional geometric centerline of the second outer layer permanent magnet slot segment defining a first angle;
   a first bent slot, the first bent slot being communicated with the first outer layer permanent magnet slot segment;
   a second bent slot, the second bent slot being communicated with the second outer layer permanent magnet slot segment, and extended lines of a length directional geometric centerline of the first bent slot and a length directional geometric centerline of the second bent slot defining a second angle, wherein the second angle is greater than the first angle;
   wherein the permanent magnet slot groups each further comprises:
   an inner layer permanent magnet slot, the outer layer permanent magnet slot is arranged adjacent to the inner layer permanent magnet slot, a magnetic conducting path is formed between the outer layer permanent magnet slot and the inner layer permanent magnet slot, and the inner layer permanent magnet slot comprises a first inner layer permanent magnet slot segment, a second inner layer permanent magnet slot segment, and a third inner layer permanent magnet slot segment arranged sequentially;
   the first inner layer permanent magnet slot segment, the second inner layer permanent magnet slot segment, and the third inner layer permanent magnet slot segment are communicated sequentially to form a U-shaped structure with an opening toward an outer edge of the rotor body, or,
   the first inner layer permanent magnet slot segment, the second inner layer permanent magnet slot segment, and the third inner layer permanent magnet slot segment are sequentially arranged at intervals, and a flux barrier is formed between two adjacent ones of the first inner layer permanent magnet slot segment, the second inner layer permanent magnet slot segment, and the third inner layer permanent magnet slot segment;
   the inner layer permanent magnet slot comprises a third bent slot, a first end of the third bent slot is communicated with an end, adjacent to the outer edge of the rotor body, of the first inner layer permanent magnet slot segment, and a second end of the third bent slot extends toward the outer edge of the rotor body and is gradually away from a direct-axis of the rotor body;
   the inner layer permanent magnet slot comprises a fourth bent slot, a first end of the fourth bent slot is communicated with an end, adjacent to the outer edge of the rotor body, of the third inner layer permanent magnet slot segment, and a second end of the fourth bent slot extends toward the outer edge of the rotor body and is gradually away from the direct-axis;
   $0.3 \times Wm1 < Lt1/k1 < 0.7 \times Wm1$, wherein Wm1 is a width of the first outer layer permanent magnet slot segment or the second outer layer permanent magnet slot segment, Lt1 is a length of a flux barrier formed between a slot wall of the first bent slot or the second bent slot and the outer edge of the rotor body, k1 is a first per unit value.

2. The rotor structure according to claim 1, wherein a first end of the first outer layer permanent magnet slot segment is arranged extending toward a rotating shaft hole of the rotor body; a second end of the first outer layer permanent magnet slot segment is arranged extending toward the outer edge of the rotor body; a first end of the second outer layer permanent magnet slot segment is arranged extending toward the rotating shaft hole; and a second end of the second outer layer permanent magnet slot segment is arranged toward the outer edge of the rotor body.

3. The rotor structure according to claim 2, wherein the first bent slot and the second bent slot are respectively located on two sides of the direct-axis of the rotor body; a first end of the first bent slot is communicated with the second end of the first outer layer permanent magnet slot segment; a second end of the first bent slot is arranged extending toward the outer edge of the rotor body and gradually away from the direct-axis; a first end of the second bent slot is communicated with the second end of the second outer layer permanent magnet slot segment; and a second end of the second bent slot is arranged extending toward the outer edge of the rotor body and gradually away from the direct-axis.

4. The rotor structure according to claim 3, wherein a width of the second end of the first bent slot is smaller than a width of the first end of the first bent slot.

5. The rotor structure according to claim 3, wherein a width of the second end of the second bent slot is smaller than a width of the first end of the second bent slot.

6. The rotor structure according to claim 1, wherein a first end of the second outer layer permanent magnet slot segment is arranged opposite to a first end of the first outer layer permanent magnet slot segment to form another V-shaped structure, or, the first end of the second outer layer permanent magnet slot segment is communicated with the first end of the first outer layer permanent magnet slot segment to form another U-shaped structure.

7. The rotor structure according to claim 6, wherein the permanent magnet slot groups each further comprises:
   a third layer permanent magnet slot; the third layer permanent magnet slot is adjacent to the inner layer permanent magnet slot; a magnetic conducting path is formed between the third layer permanent magnet slot and the inner layer permanent magnet slot; and the third layer permanent magnet slot is U-shaped or arc-shaped.

8. The rotor structure according to claim 1, wherein $0.1 \times Wm2 < Lt2/k2 < 0.35 \times Wm2$,
   wherein Wm2 is a width of the first inner layer permanent magnet slot segment or the third inner layer permanent magnet slot segment;
   Lt2 is a length of a flux barrier formed between a slot wall of the third bent slot or the fourth bent slot and the outer edge of the rotor body;
   k2 is a second per unit value.

9. The rotor structure according to claim 8, wherein $0.6 < Lt1/(Lt1/k1 + Lt2/k2) < 0.9$.

10. The rotor structure according to claim 8, wherein $Wm1/Wm2 = a \times (Lt1/k1/Lt2/k2) + b \times (L1/L2)$, wherein, a is a weight of a ratio of lengths of the flux barriers on the rotor structure;

b is a weight of a ratio of average widths of the bent slots on the rotor structure;

L1 is an average width of the first bent slot or the second bent slot;

L2 is an average width of the third bent slot or the fourth bent slot.

11. The rotor structure according to claim 10, wherein $a \in [1, 2]$, or $b=1$, or $a \in [1, 2]$ and $b=1$.

12. The rotor structure according to claim 8, wherein when Wt1<Wt2, k1=1, k2=max(Wt1, Wt2)/min(Wt1, Wt2), or, when Wt1>Wt2, k2=1, k1=max(Wt1, Wt2)/min(Wt1, Wt2), wherein Wt1 is a width of the flux barrier formed between the slot wall of the first bent slot or the second bent slot and the outer edge of the rotor body;

Wt2 is a width of the flux barrier formed between the slot wall of the third bent slot or the fourth bent slot and the outer edge of the rotor body.

13. The rotor structure according to claim 1, wherein the rotor structure further comprises an outer layer permanent magnet and an inner layer permanent magnet; the outer layer permanent magnet is disposed in the outer layer permanent magnet slot; and the inner layer permanent magnet is disposed in the inner layer permanent magnet slot.

14. The rotor structure according to claim 13, wherein min(J1, J2)>Ns×A×Wt/4P, wherein J1 is a minimum distance between a distal end of the outer layer permanent magnet and the outer edge of the rotor body;

J2 is a minimum distance between a distal end of the inner layer permanent magnet and the outer edge of the rotor body;

Ns is a number of stator teeth;

A is an angle of a pole arc, the angle being defined between lines connecting ends of side walls of the third bent slot and the fourth bent slot and a hole center of the rotating shaft hole of the rotor body, the side walls being at sides adjacent to the direct-axis;

Wt is a width of each of the stator teeth;

P is a number of poles of the rotor structure.

15. The rotor structure according to claim 13, wherein the permanent magnets are made of ferrite or bonded neodymium iron boron.

16. A permanent magnet auxiliary synchronous reluctance motor comprising a rotor structure, wherein the rotor structure is the rotor structure of claim 1.

17. An electric vehicle comprising a rotor structure, wherein the rotor structure is the rotor structure of claim 1.

* * * * *